UNITED STATES PATENT OFFICE.

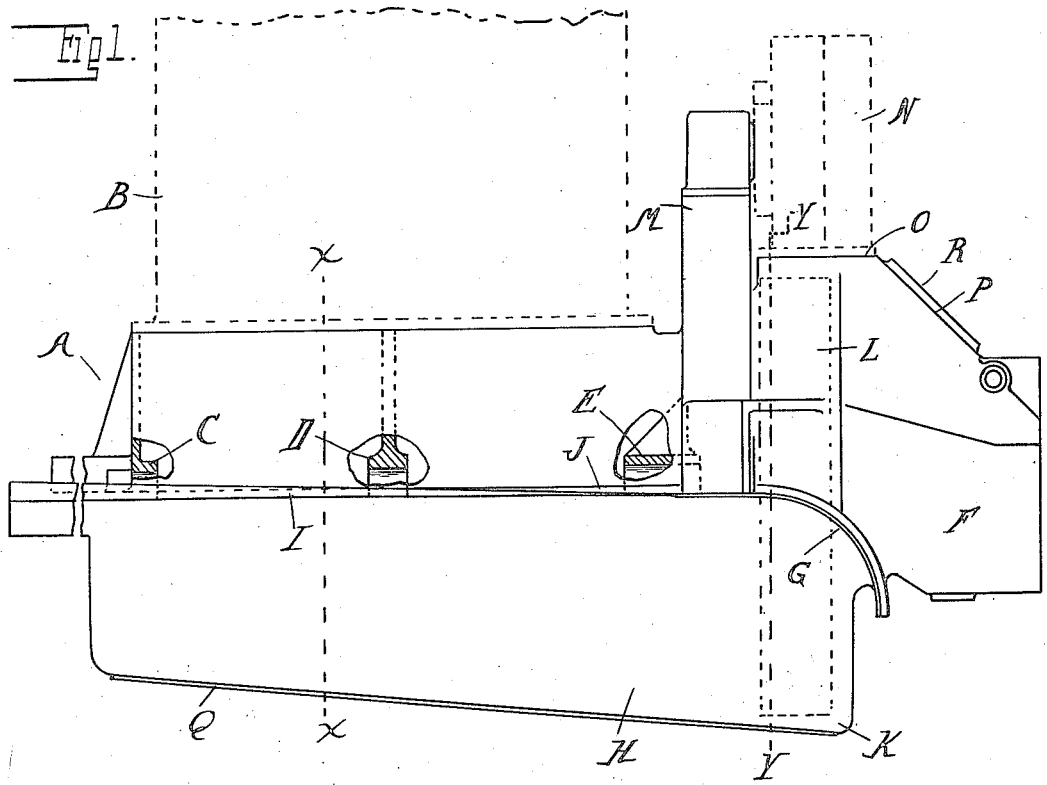
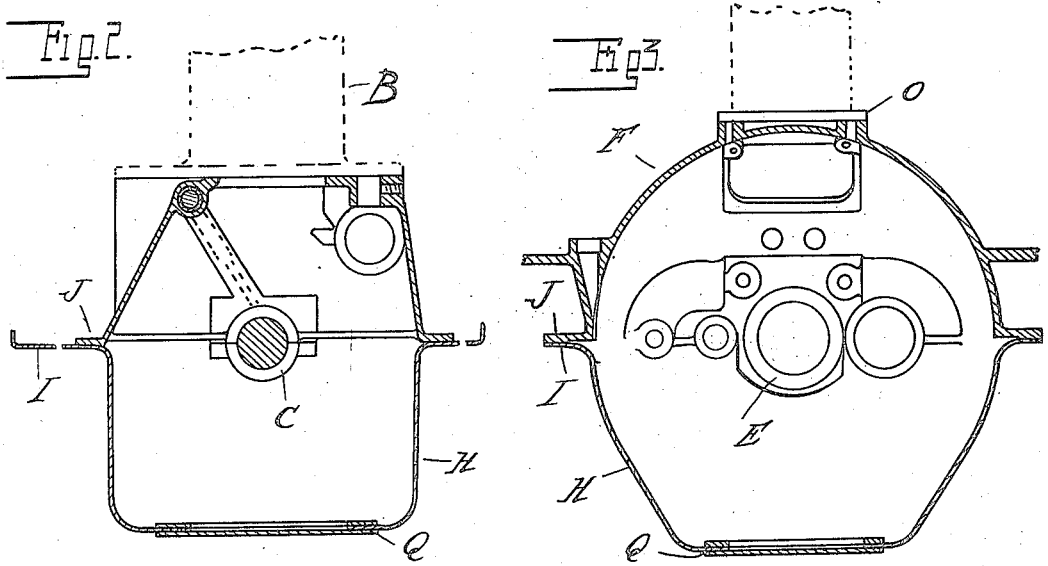

EMIL A. NELSON, OF DETROIT, MICHIGAN, ASSIGNOR TO HUPP MOTOR CAR COMPANY, OF DETROIT, MICHIGAN, A CORPORATION OF MICHIGAN.

ENGINE AND TRANSMISSION UNIT.

1,091,951.

Specification of Letters Patent. Patented Mar. 31, 1914.

Application filed February 19, 1912. Serial No. 678,672.

*To all whom it may concern:*

Be it known that I, EMIL A. NELSON, a citizen of the United States of America, residing at Detroit, in the county of Wayne and State of Michigan, have invented certain new and useful Improvements in Engine and Transmission Units, of which the following is a specification, reference being had therein to the accompanying drawings.

The invention relates to engine constructions more particularly designed for use in motor vehicles and consists in the novel construction of the engine crank case, and further in the combination thereof with a housing for the transmission gearing and for other engine accessories as hereinafter set forth.

In the drawings,—Figure 1 is a side elevation; Fig. 2 is a cross section on line $x$—$x$ Fig. 1; Fig. 3 is a cross section on line $y$—$y$ Fig. 1.

A is a member preferably formed of cast metal such for instance as aluminum and which forms the upper section of a crank case for a multi-cylinder engine unit such as indicated in dotted lines B. The lower edge of this member A is preferably in the horizontal plane of the crank shaft and a plurality of half bearings for said crank shaft are formed integral with the case, preferably the three half bearings C, D and E. Beyond these bearings is an enlarged portion F of the member A which forms a housing for a transmission gearing and also preferably a housing for a drive mechanism for the magneto and a mounting for the latter. The portion F extends below the plane of the crank shaft to form the complete housing for the transmission and this downwardly projecting portion merges into the body portion by a curved intermediate portion G, thereby avoiding any angles which would weaken the structure by localizing stresses. The crank case is completed by a lower section H formed of sheet metal and provided with flanges I for abutting against side flanges J on the member A, said flanges I being preferably extended to form a pan extending to the side sills of the chassis. The member H is also curved to conform to the curved portion G of the member A and is tapered from one end to the other so as to form an enlargement K in which the fly wheel for the engine is housed. The member A is correspondingly enlarged to receive the fly wheel as indicated at L, and a further vertical extension M forms a housing for a drive train from the crank shaft and a magneto indicated by dotted lines at N. This magneto is mounted upon a flat top portion O of the enlargement F and from this point the portion F inclines downward at P so that its outer end is symmetrical or concentric with the axis of the crank shaft.

The construction above described is one which simplifies the engine and transmission assembly as all of the bearings for the crank shaft and the transmission shaft are in the integral member A. Furthermore, this construction provides access to all of the parts of the mechanism contained therein, the member H being provided with a detachable bottom Q, and the member A with a removable lid R covering an aperture in the inclined portion P.

What I claim as my invention is:

1. The combination of a complete housing for the transmission gearing, a crank case member formed integral therewith, said crank case member having its lower edge in the plane of the crank shaft, and a complementary lower member for the crank case formed of sheet metal having its upper edge conforming to the shape of the lower edge of said crank case member, and one of its ends complementary to the adjacent portion of the housing for the transmission gearing.

2. The combination with an engine crank case member having the lower edge of the main portion in the plane of the crank shaft, of an integral extension of said member forming a transmission gearing housing and extending below the plane of the crank shaft.

3. An engine crank case member having the lower edge of the body portion thereof in the plane of the crank shaft and an extension beyond said body portion and below said plane forming a transmission gearing housing, said extension and body portion merging in a curved connection portion.

4. An engine crank case member comprising a body portion having its lower edge in the plane of the crank shaft, and an integral extension beyond said body portion curving downward below the plane of the crank shaft to form the complete housing for a transmission gearing, and a complementary member for said crank case having a portion correspondingly curved.

5. An engine crank case member having a body portion with its lower edge in the plane of the crank shaft, and an integral extension beyond said body portion curving downward below the plane of the crank shaft to form the complete housing for a transmission gearing in combination with a complementary member for the crank case housing formed of sheet metal and having its upper edge conforming to the shape of the lower edge of said first mentioned member.

6. An engine crank case member comprising a body portion having its lower edge in the plane of the crank shaft, and an integral extension beyond said body portion and below the plane of the crank shaft to form the complete housing for an alined transmission shaft and transmission gearing in combination with a complementary member for the crank case conforming to the shape of the lower edge of said first mentioned member and the downward extension thereof.

7. An engine crank case member comprising a body portion having its lower edge in the plane of the crank shaft with integral half bearings thereon for the crank shaft, and an integral extension beyond said body portion and below the plane of the crank shaft having integral bearings for the transmission shaft and the transmission gearing.

8. An engine crank shaft member having a body portion with its lower edge in the plane of the crank shaft and provided with integral half bearings for said crank shaft, an integral extension beyond said body portion having an enlargement for the fly wheel housing and a tapering portion for the transmission shaft and transmission gearing, said tapering portion extending below the plane of the crank shaft and being provided with integral bearings for the transmission shaft and gearing.

9. An engine crank case member comprising a body portion having its lower edge in the plane of the crank shaft, and an integral extension beyond said body portion having an enlargement forming the fly wheel housing, and a tapering portion extending below the plane of the crank shaft and forming a housing for the transmission shaft and transmission gearing, said enlarged portion forming a mounting for a magneto and being provided with a portion forming a housing for a magneto drive.

In testimony whereof I affix my signature in presence of two witnesses.

EMIL A. NELSON.

Witnesses:
 FRANK E. WATTS,
 GRANVILLE C. ALDRICH.